Figure 1:
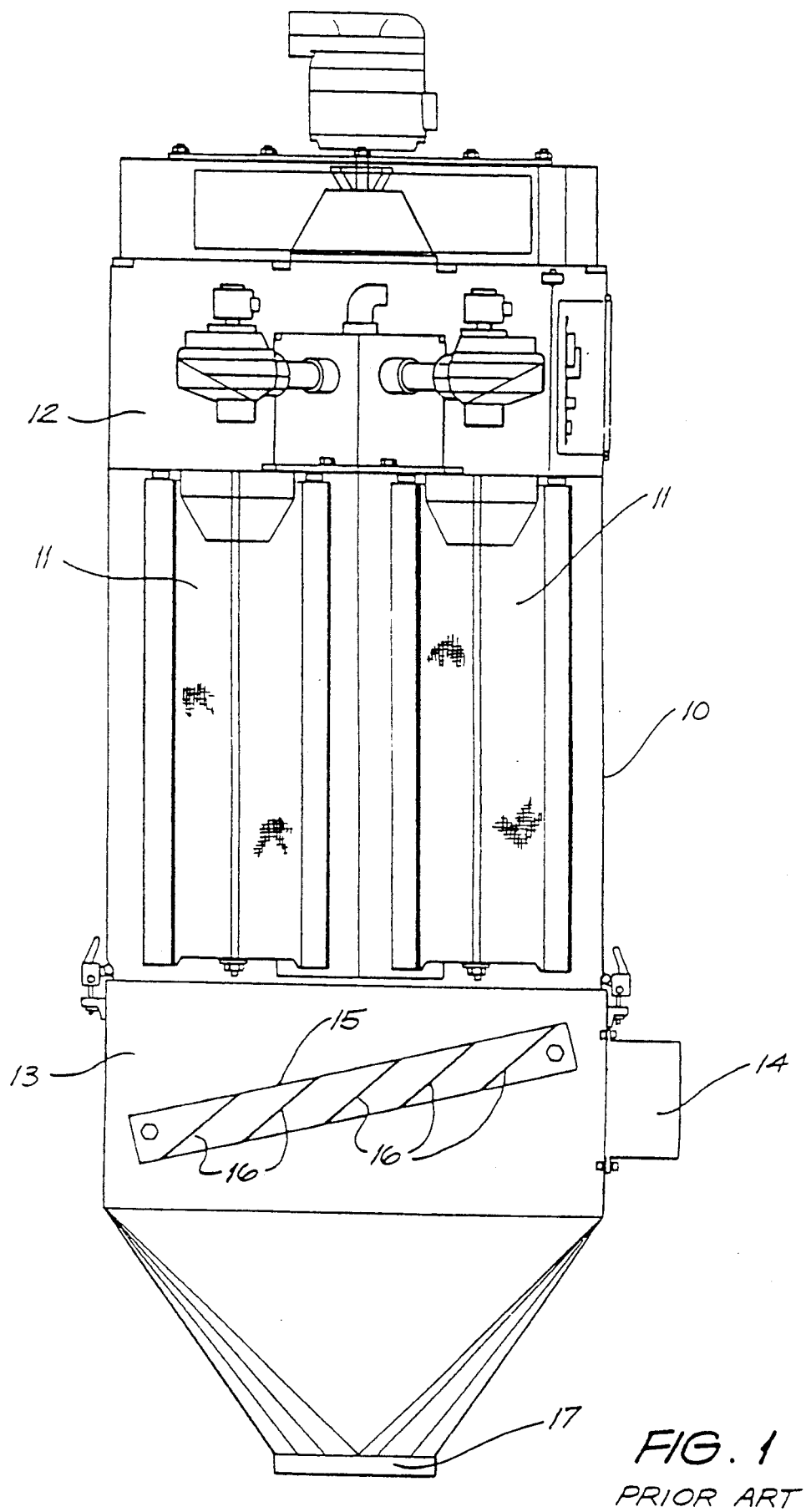

United States Patent [19]
Beavis

[11] Patent Number: 5,176,726
[45] Date of Patent: Jan. 5, 1993

[54] DUST COLLECTORS

[76] Inventor: Robert J. Beavis, 1 Campton Court, Carlingford, New South Wales, 2118, Australia

[21] Appl. No.: 814,778

[22] Filed: Dec. 30, 1991

[30] Foreign Application Priority Data

Dec. 28, 1990 [AU] Australia .................... PK4067

[51] Int. Cl.⁵ .................. B01D 46/02; B01D 50/00
[52] U.S. Cl. .................................. 55/319; 55/320; 55/341.1; 55/392; 55/418; 55/429; 55/471; 55/472
[58] Field of Search ............... 55/319, 320, 341.1, 55/341.5, 341.6, 391, 418, 419, 429, 432, 467, 471, 472, 473, 392

[56] References Cited

U.S. PATENT DOCUMENTS

| | | | |
|---|---|---|---|
| 3,454,129 | 7/1969 | Everett | 55/419 X |
| 3,881,900 | 5/1975 | Campbell et al. | 55/419 X |
| 4,224,043 | 9/1980 | Dupre | 55/319 |
| 4,303,422 | 12/1981 | Persinger | 55/319 |
| 4,590,039 | 5/1986 | Cheng | 55/341.5 X |
| 5,002,595 | 3/1991 | Kehr | 55/467 X |

Primary Examiner—Charles Hart
Attorney, Agent, or Firm—Ladas & Parry

[57] ABSTRACT

A dust collector of the type wherein a main body of the dust collector includes one or more filter elements 11 which are permeable to air but not to airborne particles above a predetermined size, a live air zone 13 below the filter elements 11 and a main air inlet port 14; a vacuum being generated on that side of the filter elements 11 opposite the live zone 13 which thereby induces a pressure differential across the filter elements 11 whereby air and entrained particulate matter is drawn through the main air inlet port 14 into the live air zone 13 within the main body 17; the dust collector further including particulate matter guiding means 18 (in one particular form being in the form of a tubular shell) for changing the direction of movement of the entrained particulate matter in the main hopper immediately after it enters the main body from the main air inlet port 14; the particulate matter guiding means comprising a duct member 18, having at least one change in cross-sectional area therein from a smaller cross-sectional area to a larger cross-sectional area and a barrier means 19 for intercepting heavy particulate matter whose trajectory is not sufficiently influenced by airflow in the duct member. The duct member 18 includes an exit location in at least a portion of the walls of the duct 18 in the area of the larger cross-sectional area. In one particular forms the exit location comprises a slot 24.

17 Claims, 8 Drawing Sheets

DUST COLLECTORS

The present invention relates to a dust collector and, more particularly, to improved means of receiving air and entrained particulate matter into the dust collector.

FIG. 1 shows one particular form of prior art dust collector suitable for use on transportable drilling rigs and the like. This form of dust collector comprises a main body 10 with filter bag units 11 therein which divide the main body 10 into two zones. The upper (clean) zone 12 includes suction fans which cause a vacuum to be generated in the upper zone on one side of the filter media which forms the filter bag units 11. The vacuum is communicated across the filter media into the lower zone of the main body 10, which zone in this specification is referred to as the live zone 13, enclosed within a lower hopper attached to the main body.

The vacuum thus created in the live zone 13 causes air and entrapped particulate matter to be drawn into the live zone by way of main air inlet port 14.

A mechanical barrier 15 is placed within the live zone 13 so as to intercept the flow of air and particulate matter entering the live zone 13 by way of the main air inlet port 14. In this particular example of the prior art the mechanical barrier 15 comprises a plurality of spaced plates 16 which are arranged in staggered, overlapping fashion across the expected trajectory of the particulate matter.

The intention is that the particulate matter, particularly the heavier particulate matter, will be deflected downwardly towards the bottom 17 of the hopper 10 and only very light particulate matter will remain entrained in the air stream that flows up and through the filter bag units 11.

In practice the air flow in the live zone 13 is very unpredictable and combined with the possibility of heavy particulate matter deflecting at high speed from the spaced plates 16 and thence off the inside walls of the bottom of the main body 17 it happens not infrequently that heavy particulate matter remains entrained in the air flow which reaches the filter bag units 11, often causing damage to the filter media making up the filter bag units 11.

It is an object of at least a preferred embodiment of the present invention to provide an improved means of control of the flow of particulate matter within the live zone 13 whereby the possibility of heavy particulate matter reaching the filter bag units 11 is minimised to a greater extent than previously known, if not entirely eliminated.

Accordingly, in one broad form of the invention, there is provided a dust collector of the type wherein a main body includes one or more filter elements which are permeable to air but not to air born particles above a predetermined size, a live air zone below the filter elements and a main air inlet port; a vacuum being generated on that side of the filter elements opposite said live zone which thereby induces a pressure differential across said filter elements whereby air and entrained particulate matter is drawn through said main air inlet port into said live air zone within said main body; said dust collector further including particulate matter guiding means for changing the direction of movement of the entrained particulate matter in said main hopper immediately after it enters said main body from said main air inlet port; said particulate matter guiding means being in fluid communication with said live air zone and comprising a duct member having at least one change in cross sectional area therein from a smaller cross sectional area to a larger cross sectional area and a barrier means for intercepting heavy particulate matter whose trajectory is not sufficiently influenced by air flow in the duct member.

Preferably said duct member is directly connected to said main air inlet.

Preferably said at least one change in cross sectional area occurs at the point of connection between said duct member and said main air inlet.

Preferably said duct member includes an additional change in cross sectional area at an exit location therefrom.

Preferably said duct member comprises a generally cylindrical member with one open end which is connected directly to said main air inlet.

Preferably said exit location comprises a slot extending the length of the cylindrical member.

Preferably said slot is at the bottom of the cylindrical member.

Preferably barrier means is located at a closed end of said cylindrical member opposite said main air inlet.

Preferably said slot comprises an additional change in cross sectional area.

In an alternative preferred form of the invention a small hopper is placed in fluid communication with said live air zone of said main hopper and located so as to contain at least a part of said particulate matter guiding means. Preferably fluid communication is exclusively by way of said particulate matter guiding means and more preferably the interconnection between said small hopper and said main hopper is such that a dead air zone is created in said small hopper.

In a particular preferred form of said alternative preferred form of the invention said small hopper contains said barrier means.

In yet a further particular preferred form of said alternative form, said small hopper contains an end portion of said cylindrical member including said barrier means. Preferably the degree of penetration of said barrier means into said small hopper is mechanically variable on site.

In an alternative broad form of the invention there is provided particulate matter guiding means for selective separation of particulate matter entrained in an air stream, said particulate matter guiding means comprising a duct member having at least one change in cross sectional area therein from a smaller cross sectional area to a larger cross sectional area whereby velocity of air flow is reduced and a barrier means for intercepting heavy particulate matter whose trajectory is not sufficiently influenced by air flow in the duct member.

In one preferred form said particulate matter guiding means comprises a separate processing unit placed at an intermediate location along a length of piping in which particulate matter is entrained in an air stream for the purpose of removing a proportion of at least larger particles from the air stream prior to the air stream entering other processing means such as dust collectors or the like.

In an alternative preferred form said particulate matter guiding means is located within a dust collector for the purpose of preventing larger particles entrained in an air stream to be treated by the dust collector from reaching the dust collector filter media.

Figure 2B:
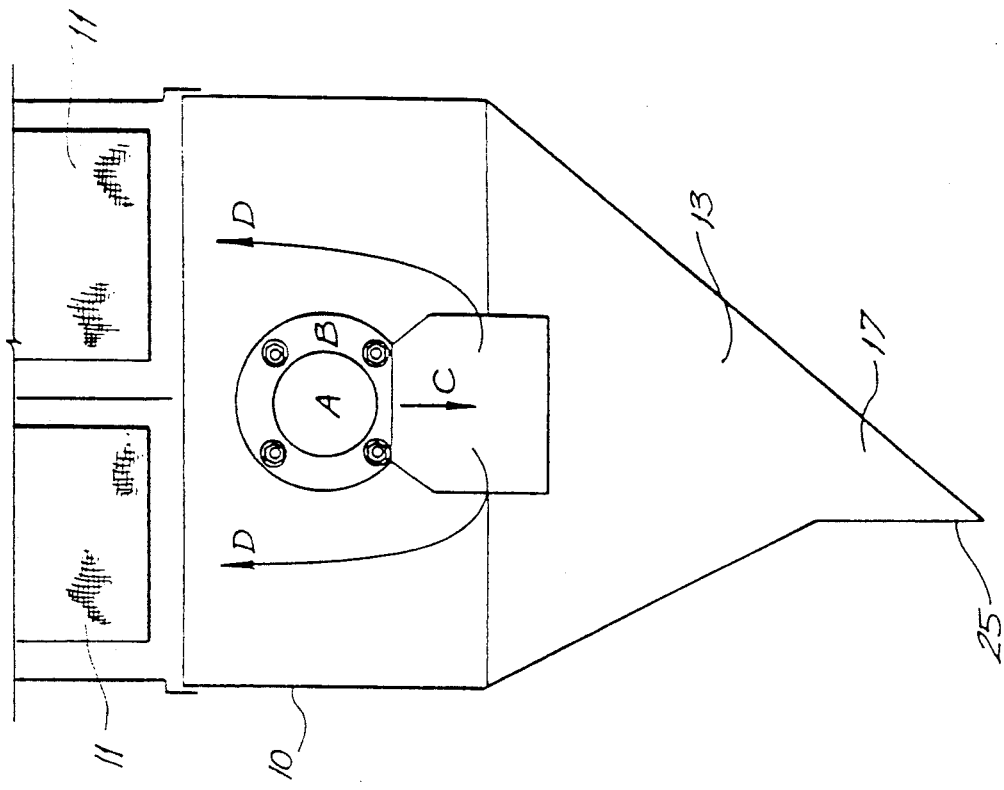
Figure 2A:
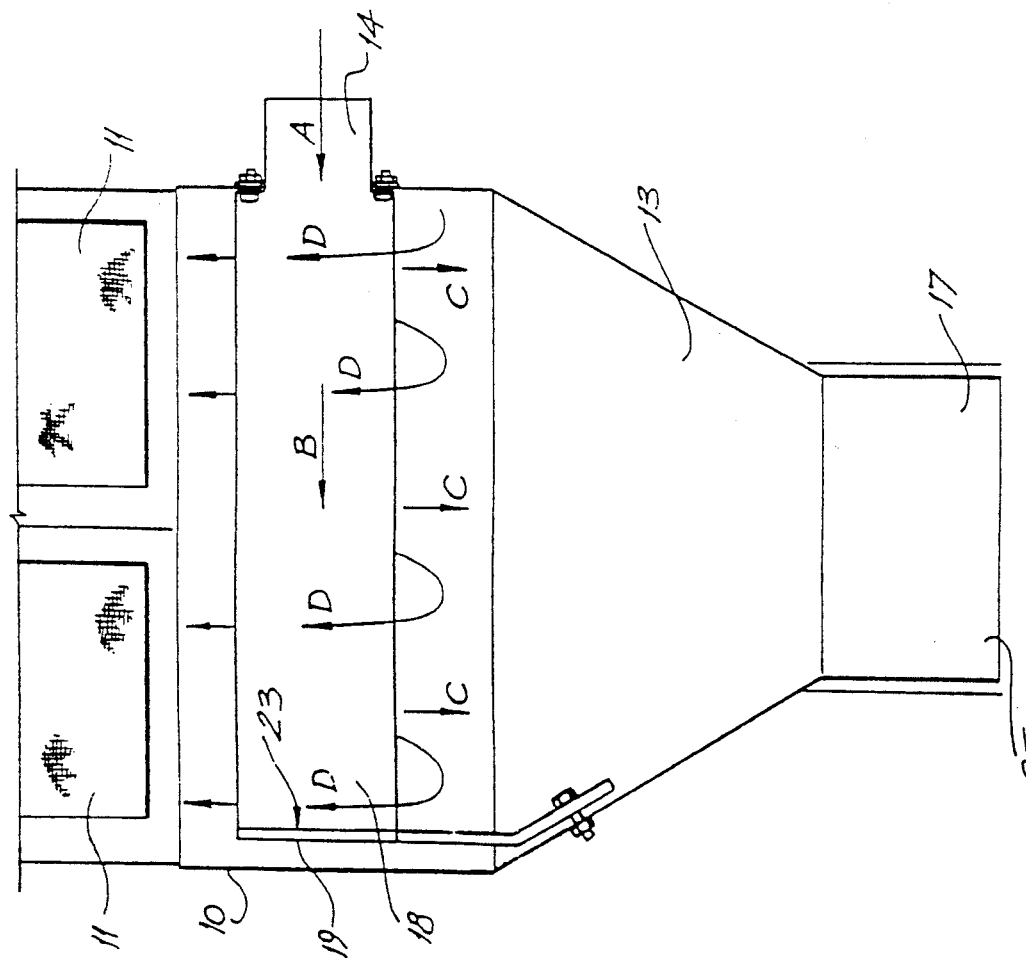
Figure 3A:
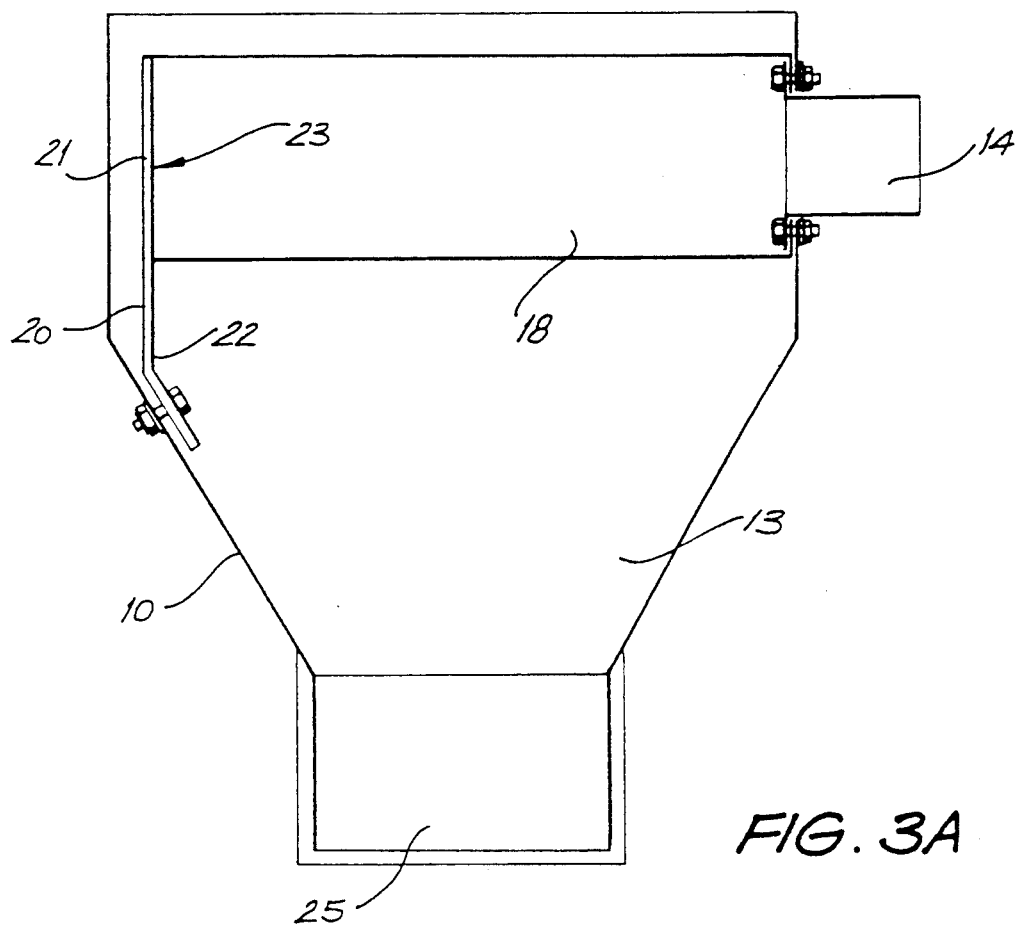
Figure 3B:
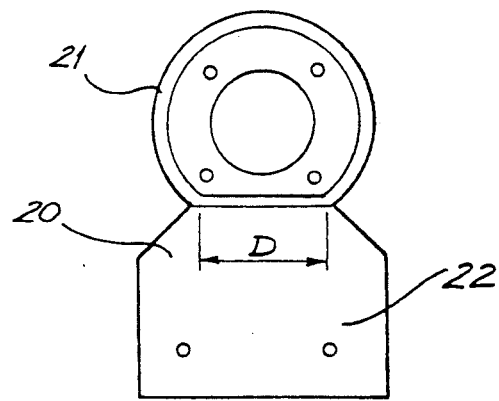
Figure 4:
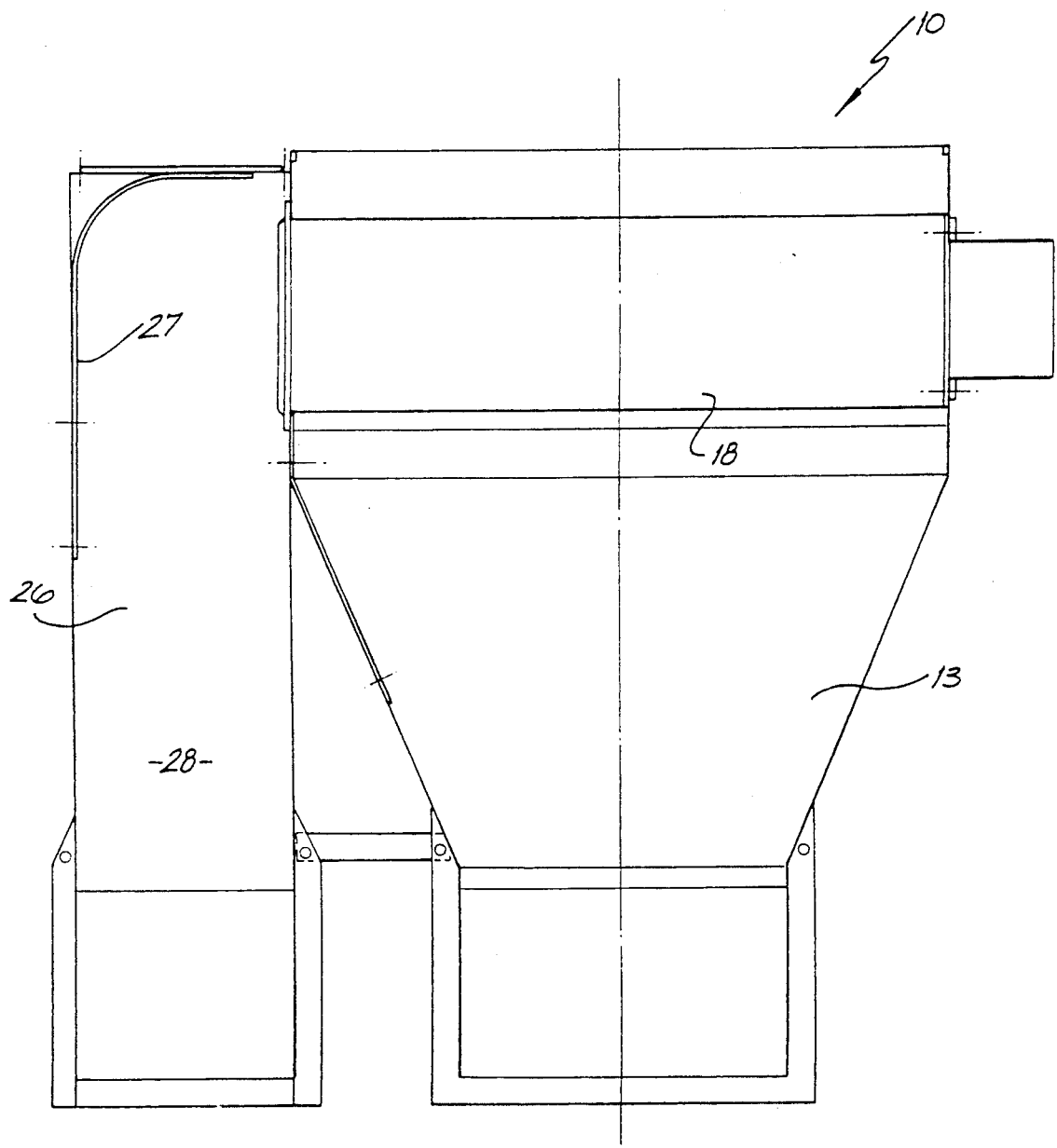
Figure 5:
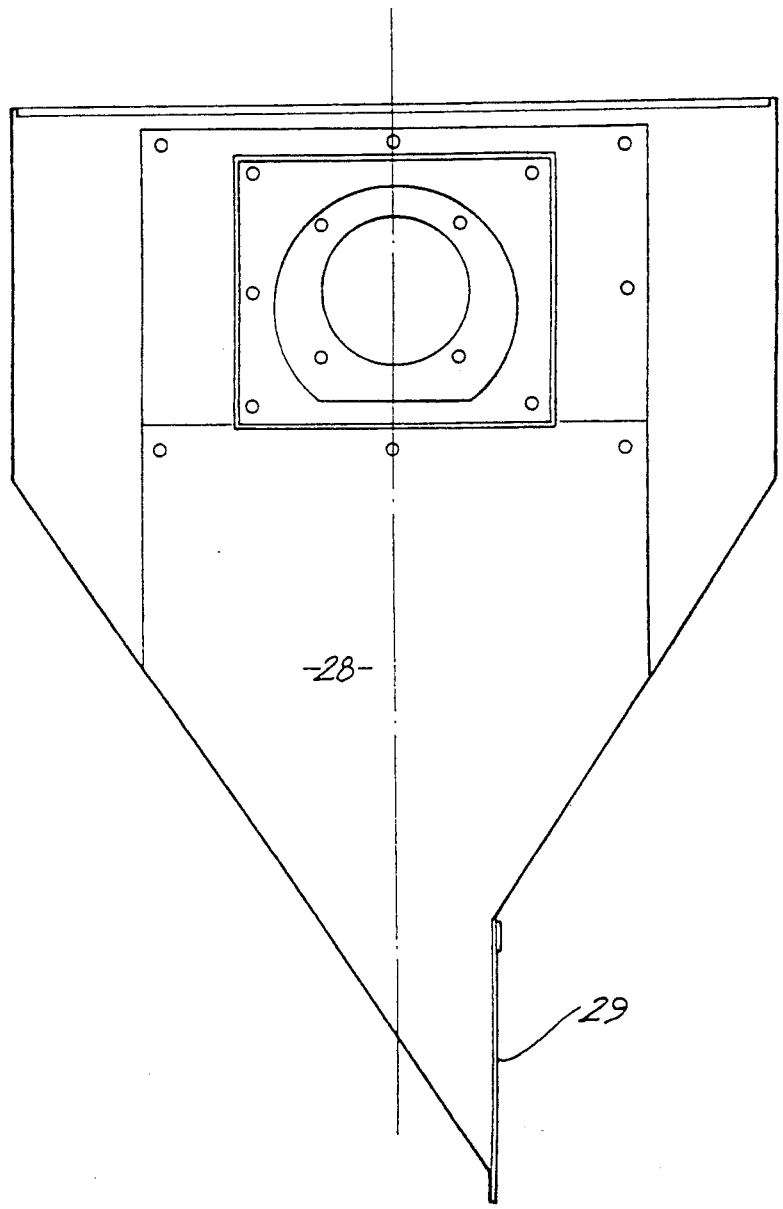
Figure 6:
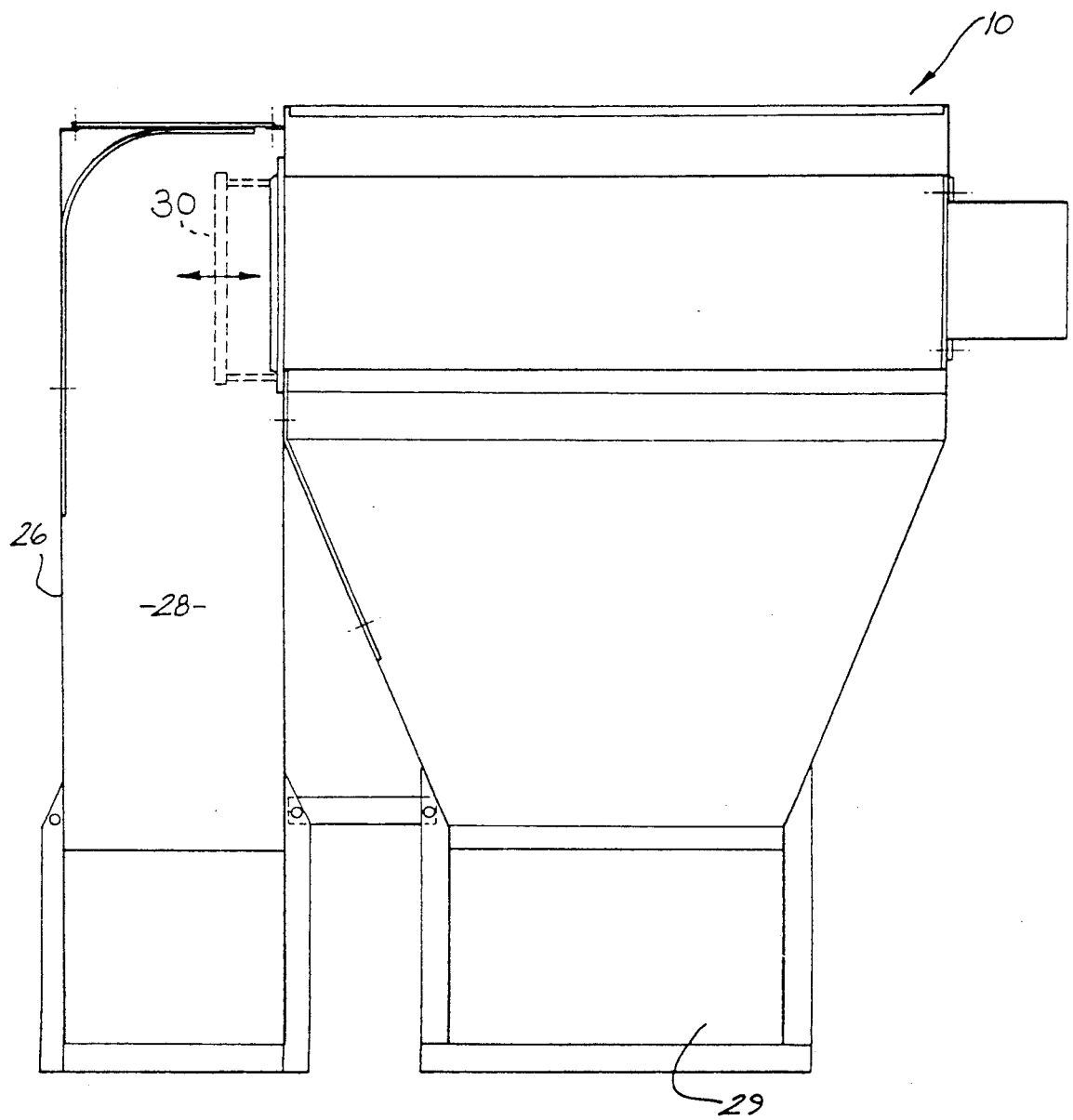
Figure 7:
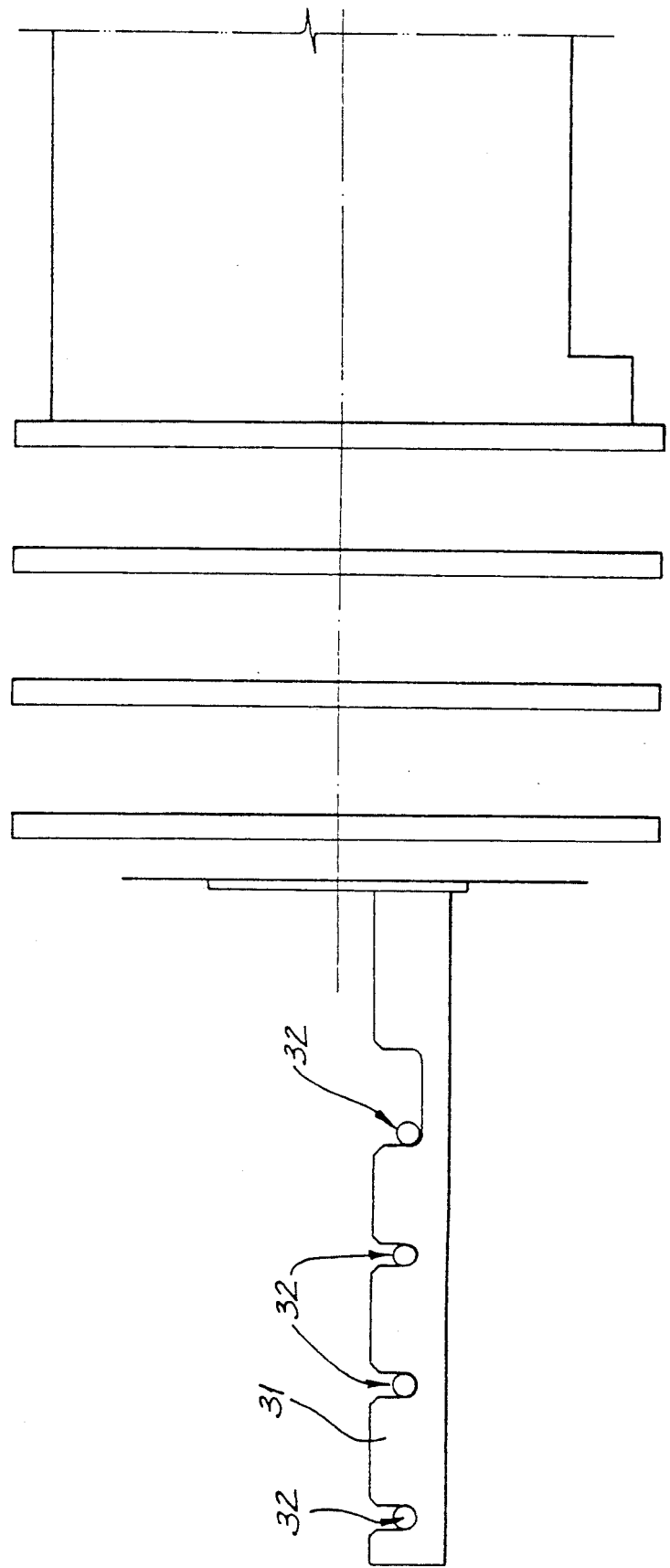
Figure 8:
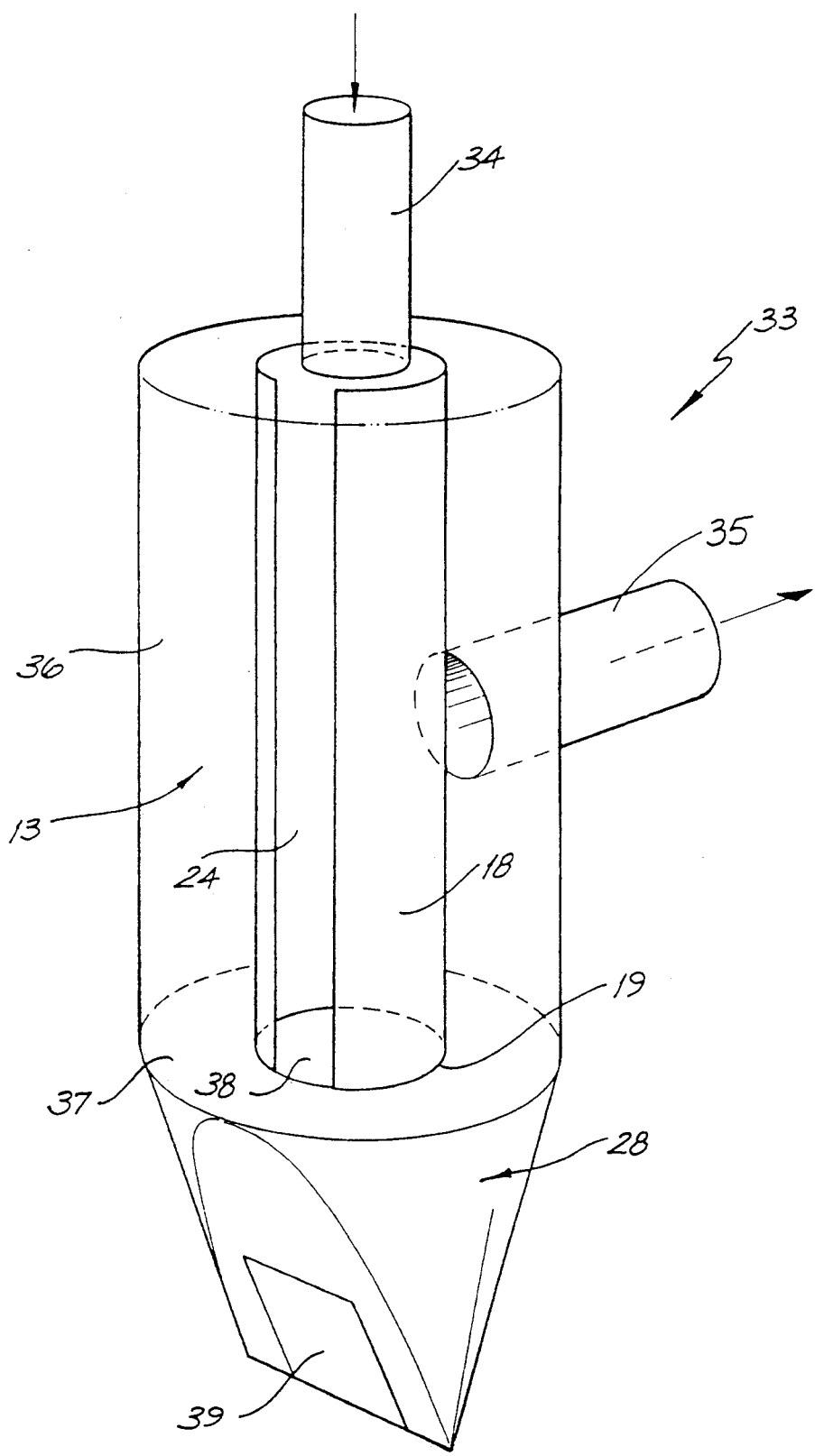

Embodiments of the invention will now be briefly described with reference to the drawings wherein:

FIG. 1 is a side section, cut away view of a prior art dust collector hopper,

FIGS. 2A and 2B show a side section and end section view of the lower portion of a dust collector hopper of a first embodiment of the invention, FIGS. 3A and 3B show detail views of an end barrier comprising part of the first embodiment, FIG. 4 is a side section view of a second embodiment of the invention, FIG. 5 is an end section view of the second embodiment, FIG. 6 is a side section view of a third embodiment of the invention, FIG. 7 shows details of a positioning mechanism for use with the end barrier of the third embodiment, and FIG. 8 is a side view, partly cut away, of a particle separator of a fourth embodiment.

The invention to be described in greater detail below relates generally to improvements in dust collectors and more particularly, though not exclusively, to dust collectors of the type which are used on transportable drilling rigs. These dust collectors perform the dual function of creating a vacuum which is supplied by hose to the drill hole where particulate matter in the form of crushed rock and dirt (created by the drilling operation) is removed under the influence of the movement of air within the hose. In addition to creating the vacuum which causes the appropriate air movement in the hose, the dust collector also provides a mechanism for collecting the particulate matter carried in the air stream within the hose and separating that particulate matter from the air stream before the air stream leaves the dust collector.

The dust collector of the preferred embodiments is improved by the incorporation of modifications to the prior art barrier 15 whereby the speed and direction of movement of the entrained particulate matter is controlled so as to make the speed and direction of movement of the particulate matter more predictable within the live zone 13 of the hopper.

In the description below like numbers are used to refer to like components in the different embodiments and in respect of the prior art description with reference to FIG. 1.

Referring to FIGS. 2 and 3, a first embodiment of the invention is shown wherein the basic structural components of the main hopper 10 are as found in the prior art. In the case of the first embodiment the prior art mechanical barrier 15 is replaced by a tubular shell 18. One end of the shell is conneced in fluid communication with main air inlet port 14. The far end 19 of the shell 18 is closed by a barrier 20.

The barrier comprises a generally circular flange portion 21 from which downwardly depends a plate 22 as best seen in FIG. 3.

The working face 23 of the barrier 20 is treated or otherwise reinforced to withstand the impact or heavy particulate matter.

An outlet slot 24 runs the length of the bottom of the tubular shell 18. The slot is of width D and aligns flush with the bottom of the circular flange portion 21 of the barrier 20.

The tubular shell 18 thus defines two changes in cross sectional area. The first occurs at the transition from region A (refer FIG. 2) to region B. The second occurs at the transition between region B and region C. Air flow entering from inlet port 14 at region A experiences an increase in cross sectional area which causes a proportional decrease in air velocity beyond the transition region. Similarly a decrease in air velocity occurs at the transition from region B to region C. The following table provides an example of theoretical air velocity at regions A, B and C for the dimensions of the transition regions indicated for a fan pulling 600 cfm through the filter bag units 11.

| AIR VELOCITIES WHEN FAN PULLING 600.CFM. THROUGH FILTERS | | | |
|---|---|---|---|
| LOCATION | SIZE | SQ. IN. | FEET/MINUTE |
| A. SUCTION HOSE | 5" I.D. | 20 | 4,600 |
| B. EXPANSION PIPE | 9" I.D. | 63.5 | 1,488 |
| C. OUTLET PIPE SLOT | 22" × 5" | 110 | 836 |
| D. HOPPER BODY | 24" × 24" | 576 | 159 |

Finally there is an increase in cross sectional area from region C to region D which causes a corresponding decrease in air velocity of air which is flowing generally upwardly towards the filter bags 11.

The effect of this arrangement is that the velocity of the air together with the velocity of any entrained particles is reduced in a stepwise, controlled fashion. In addition the direction of flow of the lighter entrained particles is also changed in accordance with the direction of flow of air.

Heavier entrained particles which do not respond to the change in air direction at the transition from region B to region C impact upon the working face 23 of barrier 20.

The collision of the heavier particles with the working face 23 momentarily causes the particles to come to a stand still. This allows the combined effects of downward air flow through the slot 24 and gravity to pull the heavier particles downwardly towards the bottom 17 of the hopper 10.

Under most circumstances it is expected that "autogenous" behavior of the heavier particles at the working face 23 will occur. That is, the heavy particles will tend to pile up against the working face 23 to a depth where the working face 23 is insulated by the layer of piled up particles from the direct impact of the particles. The depth at which the layer stabilises will depend on such factors as air velocity, particle velocity, particle size and weight and the geometry and relative sizing of the tubular shell 18 components.

Because the air velocity has been progressively reduced within the live zone 13 by the stepped changes in cross sectional area experienced by the air flow as it flows through the tubular shell 18 and out through slot 24, the result is that the air velocity at region D is sufficiently low and predominantly upwardly directed so that the heavier particles simply cannot be uplifted towards the filter bag units 11 by the air flow at region D.

Accordingly, the heavier particulate matter builds up in the bottom 17 of the hopper and can be withdrawn from the hopper by way of hopper bottom outlet 25.

It should be noted that the barrier 20 is attached by bolts both to the far end 19 of the shell 18 and also, at its lower end to an inside wall of the hopper 10 as best seen in FIG. 3.

All of the tubular shell 18 components and the barrier 20 components can be made from steel plate with those portions subject to direct mechanical impact from particulate matter being appropriately treated to improve wear characteristics.

Referring to FIGS. 4 and 5 a second embodiment of the invention is shown wherein a small hopper 26 is connected in fluid communication with the live zone 13 of the hopper 10. Fluid communication is effected by removal of the barrier 20 and cutting out a portion of a side wall of the hopper 10 which aligns with the expected trajectory of heavy particulate matter through the tubular shell 18. The dimensions and shape of the tubular shell 18 are otherwise unchanged.

In this second embodiment the barrier 20 of the first embodiment is replaced by a barrier 27 located on an end wall of the small hopper 26.

With this arrangement heavy particulate matter passes completely through hopper 10 and into the small hopper 26 to impact against barrier 27. The heavy particulate matter then falls downwardly under the influence of gravity into a dead zone 28. The heavy particulate matter builds up in the bottom of the small hopper 26 and can be removed through small hopper outlet 29 (refer FIG. 5).

Accordingly, in this second embodiment, the heavy particulate matter is removed from the effects of the air in the live zone 13 of the main hopper 10. The lighter particulate matter will continue to be entrained and move within the main hopper 10 as described in respect of the first embodiment.

Referring to FIGS. 6 and 7 a third embodiment of the invention is shown which incorporates a small hopper 26 in fluid communication with the main hopper 10 and arranged generally as for the second embodiment previously described.

In this third embodiment, however, the barrier 20 is replaced by a moveable barrier 30 which is slideably moveable within small hopper 26 from a closed position which seals the small hopper 26 from the main hopper 10 to a fully open position (illustrated in dotted lines in FIG. 6) wherein particulate matter impacts upon the barrier 30 and then falls downwardly into the dead zone 28 within the small hopper 26.

The position of the moveable barrier 30 can be made stepwise adjustable by means of a lock bar 31 (refer FIG. 7) which allows the barrier 30 to be moved to one of four discrete positions 32.

The arrangement of the third embodiment is particularly useful as a uniform sampler of particulate matter whereby, with the moveable barrier 30 adjusted to an appropriate position, a fixed proportion of all of the heavier particulate matter entering main hopper 10 will be diverted to the small hopper 26 from where the sample can be periodically removed by way of outlet 29.

The above three embodiments provide a compact, efficient dust collector which is particularly suited for use on transportable drilling rigs used for rock drilling and the like.

Referring to FIG. 8 a fourth embodiment of the invention is shown which comprises a "stand alone" particulate matter guide or filter. The stand alone filter 33 illustrated in FIG. 8 comprises an inlet pipe 34 and an outlet pipe 35 connected as shown to a generally cylindrical body 36. Housed coaxially in the upper of the body 36 is a tubular shell 18 oriented so that its slot 24 faces directly away from outlet pipe 35. Inlet pipe 34 feeds into the interior of the tubular shell 18.

A lower flange 37 supports the tubular shell 18 at its far end 19 from inlet pipe 34 within the cylindrical body 36. The lower flange 37 includes an aperture 38 coaxial with the tubular shell 18 whereby the interior of the shell 18 is in communication wtih dead zone 28 on the other side of the flange 37 within the lower part of the cylindrical body 36.

Similarities will be noted in this construction when compared with the second embodiment (FIG. 4) of the invention in particular.

In use air with particular matter entrained therein is injected along the longitudinal axis of the shell 18 by way of inlet pipe 34. The air injection is caused by a vacuum in outlet pipe 35 whereby the air stream from inlet pipe 34 passes out through slot 24 and around the outer sides of the tubular shell 18 in the upper part of the cylindrical body 36 and thence into outlet pipe 35.

Changes in cross sectional area along the air stream path are experienced in the same manner as in the previously described embodiments. However, as with the previous embodiments, particularly heavy particulate matter will not be sufficiently influenced by the air stream within the shell 18 to emerge from the slot 24 but, rather, will continue on through aperture 38 and into dead zone 28 impacting against the bottom of the cylindrical body 36. Once in the dead zone 28 the heavy particulate matter is removed from the air stream flowing from inlet pipe 34 to outlet pipe 35. The particulate matter in the dead zone 28 can be removed by means known in the trade such as outlet flap 39.

The stand alone filter 33 can be placed in a pipeline for the purposes of removing at least the heavier particulate matter entrained in the air flow in the pipeline. It can also be used as a sampler of that heavy particulate matter.

The above describes only some embodiments of the present invention and modifications obvious to those skilled in the art can be made thereto without departing from the scope and spirit of the present invention.

For example the various functional components making up the embodiments can be housed in the one enclosure or separately. In particular the small hopper 26 of the second and third embodiments can be incorporated structurally within a portion of the main hopper 10.

It should be noted that whilst the primary purpose of the embodiments of the invention described is to separate particulate matter from an air flow, the device will also separate water and water droplets trapped in the air stream to a limited extent. This can be useful in drilling operations where it sometimes happens that water is encountered and is drawn up into the vacuum line. If water reaches the filter media in the dust collector the immediate effect is usually a dramatic drop in air velocity in the line and is, therefore, to be avoided.

The claims defining the invention are as follows:

1. A dust collector of the type wherein a main body includes one or more filter elements which are permeable to air but not to air born particles above a predetermined size, a live air zone below the filter elements and a main air inlet port; a vacuum being generated on that side of the filter elements opposite said live zone which thereby induces a pressure differential across said filter elements whereby air and entrained particulate matter is drawn through said main air inlet port into said live air zone within said main body; said dust collector further including particulate matter guiding means for changing the direction of movement of the entrained particulate matter in said main hopper immediately after it enters said main body from said main air inlet port; said particulate matter guiding means being in fluid communication with said live air zone and comprising a duct member having at least one change in cross sectional area therein from a smaller cross sectional area to a larger cross sectional area and a barrier means for intercepting heavy particulate matter whose trajectory is not sufficiently influenced by air flow in the duct member.

2. The dust collector of claim 1 wherein said duct member is directly connected to said main air inlet.

3. The dust collector of claim 1 wherein said at least one change in cross sectional area occurs at the point of connection between said duct member and said mean air inlet.

4. The dust collector of claim 1 wherein said duct member includes an additional change in cross sectional area at an exit location therefrom.

5. The dust collector of claim 4 wherein said duct member comprises a generally cylindrical member with one open end which is connected directly to said main air inlet.

6. The dust collector of claim 4 wherein said exit location comprises a slot extending the length of the cylindrical member.

7. The dust collector of claim 6 wherein said slot is at the bottom of the cylindrical member.

8. The dust collector of claim 1 wherein said barrier means is located at a closed end of said cylindrical member opposite said main air inlet.

9. The dust collector of claim 7 wherein said slot comprises an additional change in cross sectional area.

10. The dust collector of claim 1 wherein a small hopper is placed in fluid communication with said live air zone of said main hopper and located so as to contain at least a part of said particulate matter guiding means.

11. The dust collector of claim 10 wherein fluid communication is exclusively by way of said particulate matter guiding means.

12. The dust collector of claim 10 wherein the interconnection between said small hopper and said main hopper is such that a dead air zone is created in said small hopper.

13. The dust collector of claim 10 wherein said small hopper contains said barrier means.

14. The dust collector of claim 13 wherein said small hopper contains an end portion of said cylindrical member including said barrier means. Preferably the degree of penetration of said barrier means into said small hopper is mechanically variable on site.

15. Particulate matter guiding means for selective separation of particulate matter entrained in an air stream, said particulate matter guiding means comprising a duct member having at least one change in cross sectional area therein from a smaller cross sectional area to a larger cross sectional area whereby velocity of air flow is reduced and a barrier means for intercepting heavy particulate matter whose trajectory is not sufficiently influenced by air flow in the duct member.

16. The particulate matter guiding means of claim 15 wherein said particulate matter guiding means comprises a separate processing unit placed at an intermediate location along a length of piping in which particulate matter is entrained in an air stream for the purpose of removing a proportion of at least larger particles from the air stream prior to the air stream entering other processing means such as dust collectors or the like.

17. The particulate matter guiding means of claim 15 wherein said particulate matter guiding means is located within a dust collector for the purpose of preventing larger particles entrained in an air stream to be treated by the dust collector from reaching the dust collector filter media.

* * * * *